United States Patent
Thompson

(10) Patent No.: US 7,776,125 B2
(45) Date of Patent: Aug. 17, 2010

(54) COMPOSITION AND METHOD FOR INHIBITING CAKING IN A UREA CONTAINING FERTILIZER

(75) Inventor: Harold Thompson, Powell, OH (US)

(73) Assignee: OMS Investments, Inc., Los Angeles, CA (US)

(*) Notice: Subject to any disclaimer, the term of this patent is extended or adjusted under 35 U.S.C. 154(b) by 322 days.

(21) Appl. No.: 11/805,655

(22) Filed: May 24, 2007

(65) Prior Publication Data

US 2007/0277572 A1     Dec. 6, 2007

Related U.S. Application Data

(60) Provisional application No. 60/809,477, filed on May 31, 2006.

(51) Int. Cl.
*A01N 25/00* (2006.01)

(52) U.S. Cl. ................................. 71/64.12; 71/64.1

(58) Field of Classification Search ............... 71/64.12, 71/64.1
See application file for complete search history.

(56) References Cited

U.S. PATENT DOCUMENTS

| | | |
|---|---|---|
| 3,076,700 A | 2/1963 | Renner |
| 3,231,363 A | 1/1966 | Renner |
| 3,323,518 A | 6/1967 | Swanson |
| 3,683,057 A | 8/1972 | Fuji et al. |
| 3,705,794 A | 12/1972 | Czurak et al. |
| 3,915,736 A | 10/1975 | Oyamada et al. |
| 4,025,329 A | 5/1977 | Goertz |
| 4,107,274 A | 8/1978 | Knorre et al. |
| 4,185,988 A | 1/1980 | Kistler et al. |
| 4,490,281 A | 12/1984 | James et al. |
| 4,849,006 A * | 7/1989 | Knudson, Jr. ............... 71/64.11 |
| 4,936,901 A | 6/1990 | Surgant, Sr. et al. |
| 5,102,440 A | 4/1992 | Gallant et al. |
| 5,144,024 A * | 9/1992 | Pepper et al. ................ 536/128 |
| 5,204,010 A * | 4/1993 | Klewsaat ..................... 510/527 |
| 5,290,475 A * | 3/1994 | Wixon ......................... 510/299 |
| 5,354,742 A | 10/1994 | Deming et al. |
| 5,364,440 A | 11/1994 | Schapira et al. |
| 5,728,742 A | 3/1998 | Staples et al. |
| 5,872,093 A * | 2/1999 | Convents et al. ............. 510/475 |
| 6,039,781 A | 3/2000 | Goertz et al. |
| 6,150,570 A | 11/2000 | Gutmann et al. |
| 6,812,022 B1 * | 11/2004 | Aonuma ................... 435/252.5 |
| 6,890,888 B2 * | 5/2005 | Pursell et al. ............... 504/323 |
| 6,984,662 B2 * | 1/2006 | Cottrell et al. ............... 514/471 |
| 7,018,441 B2 | 3/2006 | Tabei |

OTHER PUBLICATIONS

Notification of Transmittal of the International Search Report and the Written Opinion of the International Searching Authority, or the Declaration, dated Nov. 28, 2007.

* cited by examiner

*Primary Examiner*—Timothy C Vanoy
*Assistant Examiner*—Michelle Hou
(74) *Attorney, Agent, or Firm*—Hunton & Williams LLP

(57) ABSTRACT

Compositions and methods are provided for inhibiting caking or clumping in urea containing fertilizers by reducing the crystal aspect ratios of the crystals formed in the fertilizer to a level sufficient to effectively eliminate caking in a treated fertilizer.

9 Claims, No Drawings

COMPOSITION AND METHOD FOR INHIBITING CAKING IN A UREA CONTAINING FERTILIZER

CROSS-REFERENCE TO RELATED APPLICATION

This application claims priority to Provisional Application 60/809,477, filed May 31, 2006, which is incorporated herein in its entirety.

BACKGROUND OF THE INVENTION

1. Field of the Invention

The present invention relates generally to compositions and methods for inhibiting caking or clumping in fertilizers, and more particularly to compositions and methods for inhibiting caking or clumping in urea containing fertilizers by modifying the crystal growth of the urea in the fertilizer over time.

2. Description of Related Art

Urea containing fertilizer compositions have been known and in use for many years. Urea-formaldehyde fertilizers in particular provide a high level of nitrogen availability, which is necessary to maintain growth and color of lawn turf. Examples of useful and effective urea-formaldehyde fertilizers which attain these goals, and processes for their preparation are disclosed in U.S. Pat. Nos. 3,076,700 and 3,231,363, issued to Victor A. Renner. Improvements in urea-formaldehyde fertilizers and processes for their preparation and application are taught in such patents as U.S. Pat. No. 3,223,518 issued to Louis I. Hanson, U.S. Pat. No. 4,025,329 issued to Harvey Maurice Goertz, U.S. Pat. No. 6,039,781 to Harvey M. Goertz et al., and U.S. Pat. No. 5,102,440 issued to William Gallant et al.

While urea-formaldehyde fertilizers in general, as exemplified by those disclosed in the above noted patents, have been found to be extremely useful, it has been found that solid, granulated, urea containing fertilizers such as urea-formaldehyde fertilizers have a tendency to cake or clump over time, such as during storage, causing problems in spreading and/or disseminating the resulting caked or clumped fertilizer products.

It has been found that fertilizers, particularly granulated urea containing fertilizers, which are hygroscopic, develop crystals, and particularly crystal bridges as they age under typical storage conditions. Urea crystal growth and the formation of crystal bridges are major factors in causing undesirable caking and/or clumping of urea containing fertilizers. In an attempt to resolve these problems, anti-caking agents and crystal modifiers have been proposed heretofore. However, such previously suggested agents have not satisfactorily solved the caking/clumping problems in urea containing fertilizers.

For example, known anti-caking agents normally have been applied to the surface of the fertilizer particles, and due to inefficient coating techniques, have resulted in only partially coated granules, providing less than effective reduction in caking of the granules. In addition, over time, such surface applied coatings may break away from the granules, and thus the treatment slowly loses effectiveness.

Accordingly, crystal growth in urea containing fertilizers has been found to be a major factor in causing caking of such fertilizers over time. For example, when grown from relatively pure solutions, urea crystallizes in long needles having length to width ratios ("crystal aspect ratios") that can exceed 50:1. It is believed that these high crystal aspect ratios contribute significantly to the development of hard caking during typical storage of fertilizers, particularly methyleneurea (MU) fertilizers.

Furthermore, when grown from solutions containing methyleneurea (MU) polymer chains, urea also will crystallize into long needles which contribute to the development of hard caking during storage. For example, when the MU polymer concentration approaches about 45% of the total resin nitrogen distribution, the polymer chains can impair the urea aspect ratio to a degree and, thus, somewhat lower crystal aspect ratios of about 30:1 can be observed which have been found to be sufficiently high to develop substantial fertilizer caking in mixtures containing urea mixed with MU polymers.

It is believed that outward growth of such long crystal needles from the surface of fertilizer particles enables them to bond with outwardly growing crystal needles of other particles causing caking or clumping effects. For example, the ability of urea crystals to achieve the crystal aspect ratios described above causes the urea particles to bond with other particles causing the particles to lock together into concrete-like lumps over time.

It has been suggested that biuret can be mixed with urea, resulting in a molecular level modification of its crystal growth habit. Biuret treated urea crystals have many small aspect ratios. However, in the concentrations required for crystal growth modification to substantially reduce caking of the granules, the biuret would be phytotoxic to many turf grasses, and therefore could not be considered as useful for treatment of urea containing fertilizers.

SUMMARY OF THE INVENTION

Accordingly, it is an object of the present invention to provide a composition for inhibiting caking in a urea containing fertilizer which is not phytotoxic to many turf grasses at concentrations useful for inhibiting such caking.

Another object of the invention is to provide a composition for inhibiting caking in a urea containing fertilizer which modifies the formation of crystals in the fertilizer.

Still another object of the invention is to provide methods for the preparation of compositions for inhibiting caking in urea containing fertilizers.

Yet another object of this invention is to provide a method of inhibiting caking in urea containing fertilizers.

In particular, it is an object to provide a composition for inhibiting caking in urea containing fertilizers, in which the composition contains at least one compound in an amount sufficient to modify formation of crystals in the urea containing fertilizer to a level such that the crystal aspect ratio of the crystals formed in the fertilizer are reduced sufficiently to effectively eliminate caking in the treated fertilizer.

More particularly, it is an object to provide a composition for inhibiting caking in urea containing fertilizers comprising an aqueous formulation containing at least one compound selected from the group consisting of quaternary ammonium compounds, salts of quaternary ammonium compounds, carboxylate based dendrimers, polyols and mixtures thereof wherein the at least one compound is present in the composition in an amount sufficient to modify formation of crystals in a urea containing fertilizer treated with the composition to a level such that the crystal aspect ratios of the crystals formed in the fertilizer are reduced sufficiently to effectively eliminate caking in the treated fertilizer.

DETAILED DESCRIPTION OF THE INVENTION

In accordance with the present invention, a composition is provided for inhibiting caking in urea containing fertilizers, in which the composition contains at least one compound in an amount sufficient to modify formation of crystals in the urea containing fertilizer to a level such that the crystal aspect ratio of the crystals formed in the fertilizer are reduced sufficiently to effectively eliminate caking in the treated fertilizer. These compounds are sometimes referred to hereinafter as crystal growth modifiers (CGMs).

The at least one CGM compound in the composition described above is selected from the group consisting of quaternary ammonium compounds, salts of quaternary ammonium compounds, carboxylate based dendrimers, polyols and mixtures thereof. Preferred quaternary ammonium compounds and their salts are tallowalkyltrimethyl ammonium and tallowalkyltrimethyl ammonium chloride. A particularly preferred tallowalkyltrimethyl ammonium chloride is available as Arquad®T-27W, marketed by Akzo Nobel Surfactants, Chicago, Ill., USA, containing 73% water. A preferred carboxylate based dendrimer is a polycarboxylate dendrimer available as SpectraGuard® SC marketed by Professional Water Technologies, Inc., Vista, Calif., USA, containing 60% water. Preferred polyols are: Hystar®3375 (25% water 15% sorbitol, minimum 20% maltitol), Malltisweet® 3145 (approx. 25.0% water, approx. 5% sorbitol, approx. 65% maltitol) and SORBO® (28.5-31.5% water, NLT 64% D-sorbitol), all marketed by SPI Polyols, New Castle, Del., USA. Maltitol is also known as 4-O-α-glucopyranosyl-D-sorbitol.

While it is believed that any urea containing fertilizer can be treated with the CGM compounds of the present invention to attain inhibition of the crystal growth of the urea in the fertilizer and inhibition of caking over time, urea-formaldehyde fertilizers in granular form, such as, for example, those described in U.S. Pat. No. 3,076,700, employing a granular carrier, and those described in U.S. Pat. Nos. 3,231,363 and 5,102,440, of a self supporting structure, all of which may include other fertilizers and other agricultural compositions, are particularly useful with the compositions of this invention.

As described in U.S. Pat. No. 5,102,440, carrier-less granular slow release fertilizer can be prepared by spraying a urea-formaldehyde resin composition having a Urea to formaldehyde ratio ranging from 2.4 to 13.3 onto finely divided solid materials, and cooling the resulting sprayed product to solidify the resin composition, providing a matrix within which the solid particulate raw materials are bound.

In a preferred embodiment of this invention, significantly reduced caking is encountered in methyleneurea (MU) fertilizers by including a crystal growth modifier (CGM) in an amount of about 2.0% to about 3.0% by weight of the MU resin. This concentration is somewhat higher than the concentrations, which may be as low as 0.5% by weight, required for use in pure urea based fertilizers due to the interactions with the longer MU polymer chains. The higher concentration of CGM substantially affects the growth of urea crystals such that their measured aspect ratio maximum ranges between about 6:1 and 15:1. When the crystal aspect ratio growth rate is impaired, crystal size and relative strength is substantially reduced. In addition, the ability of the crystals to bond together is minimized, due to the overall shorter length of each crystal. These physical characteristics synergistically limit the amount of crystal bridging that can occur over time. The bridging phenomenon allows particles to adhere together, as growing crystals fill the inter-particle void space and form high tensile strength physical bonds. Crystal bridging is one of the most significant physical phenomena that contribute to the development of caking or clumping as fertilizers age during storage. When these critical factors are curtailed in combination, the net result is a dramatic reduction in fertilizer caking of 50% to 85% when compared to experimental controls.

The following specific examples are presented to further illustrate and explain certain aspects of the present invention. However, the examples are set forth for illustration only, and are not to be construed as limiting on the present invention. In the following examples, all percentages and parts are by weight unless otherwise specified.

As shown in Examples 1-5 hereinbelow, all concentrations of the aqueous solutions of the CGM compounds employed for treatment of the urea containing fertilizers are expressed by weight of the total Formulations including the weight of the CGM compounds employed (such as the weight of the quaternary ammonium compounds, salts of quaternary ammonium compounds, carboxylate based dendrimers, polyols and the like) and the weight of the treated urea containing solutions including the weight of the water and the urea solutions in the aqueous Formulations.

EXAMPLE 1

In accordance with this example, 400 grams of a saturated urea 'stock' solution was prepared by mixing equal parts of water and solid prilled urea in a large beaker. This 50:50 mixture was then heated to and maintained at a temperature of 150 to 160° F. while agitated to ensure complete dissolution of the urea prills. Once all of the urea was dissolved, 25 gram portions of the heated saturated urea 'stock' solution were charged to individual small beakers and maintained at 150-160° F.

In another breaker, 50 grams of a solution containing a quaternary ammonium chloride salt compound (tallowalkyltrimethyl ammonium chloride) and 73% water which is marketed under the trademark Arquad®T-27W by Akzo Nobel Surfactants, Chicago, Ill., USA, was heated to a temperature of 160-170° F. and aliquot fractions of the heated quaternary ammonium salt compound solution were added to individual 25 gram portions of the heated 'stock' solution at concentrations consistent with the weight percentages shown in Table 1 below, and each of the additive combinations was mixed uniformly, while maintaining the solution temperature of 150-160° F., to form Aqueous Formulation A samples.

Once the Aqueous Formulation A samples containing the Arquad® T-27W quaternary ammonium chloride salt compound and the saturated urea 'stock' solution, were uniformly mixed, a 1.5 gram of each of these sample mixtures at each of the concentrations shown in Table 1 was placed in a micro evaporating dish having an overall diameter of 20 mm and a lip height of 5 mm.

Then, each micro evaporating dish was placed in a humidity chamber set at 120° F. and 60% RH for six hours and then a vacuum desiccator at ambient temperature for 18 hours. The micro evaporating dishes were exposed to this high temperature and low temperature cycling for seven days to evaporate the water and accelerate the rate of urea crystal growth. Following the seven-day cycling period, the micro evaporating dishes were allowed to age at ambient temperatures for three weeks. After this aging period, each sample was relatively free of water and urea crystals were visible to the naked eye.

However, for complete characterization of these crystals, higher resolution scanning electron microscopy techniques were required to determine if crystal growth habits had been altered. In this respect, the crystal aspect ratio of the crystals formed in the urea solutions in the tested Aqueous Formulation A samples was determined by using a scanning electron microscope to obtain micrograph images. The length and width of the crystals were measured and the aspect ratio was calculated at each concentration of the quaternary ammonium chloride salt in the Aqueous Formulation A. At least 250 crystals were depicted in the micrograph images for purposes of assuring the statistical significance of the collected data. The results of this testing are shown in Table 1 below:

TABLE 1

Crystal Measurement Analysis for Aspect Ratio (Length to Width) in Aqueous Formulations Containing a Quaternary Ammonium Chloride Salt

| Concentration of Quaternary Ammonium Chloride Salt in Aqueous Formulation A | Minimum | Maximum | Range | Mean |
|---|---|---|---|---|
| 0% | 1.03 | 48.13 | 47.10 | 4.02 |
| 0.1% | 1.10 | 76.20 | 75.10 | 3.33 |
| 0.5% | 1.00 | 12.00 | 11.00 | 2.70 |
| 0.75% | 1.04 | 9.39 | 8.35 | 2.46 |
| 1.0% | 1.00 | 7.09 | 6.09 | 2.50 |

Concentrations of quaternary ammonium salt which are effective for reducing the aspect ratio of urea crystals in a concentrated urea solution (ie, a fertilizer composition) to a level which provides effective inhibition of caking in the urea solution have been found to be in a range of about 0.5% to at least about 1.0% by weight of the total composition as demonstrated by the results tabulated in Table 1. Employing such amounts of quaternary ammonium salts, it has been found that the aspect ratio of the crystals in the fertilizer were reduced from a level of about 50 (in a control where the fertilizer sample comprises 100% urea) to a level of from about 5 to about 15 when the urea fertilizer sample is treated with the quaternary ammonium salts.

EXAMPLE 2

In this example, Aqueous Formulation B is a solution containing a polycarboxylate dendrimer compound and 60% water which is marketed under the trademark SpectraGuard® SC by Professional Water Technologies, Inc., Vista, Calif., USA. The SpectraGuard® SC solution was added to a saturated urea 'stock' solution of Example 1 in the percentages noted in Table 2 employing the procedures set forth in Example 1. The crystal aspect ratios were measured as in Example 1, with the results shown in Table 2:

TABLE 2

Crystal Measurement Analysis for Aspect Ratio (Length to Width) in Aqueous Formulations Containing a Polycarboxylate Dendrimer

| Concentration Polycarboxylate Dendrimer in Aqueous Formulation B | Minimum | Maximum | Range | Mean |
|---|---|---|---|---|
| 0% | 1.03 | 48.13 | 47.10 | 4.02 |
| 0.1% | 1.03 | 38.16 | 37.13 | 4.25 |
| 0.5% | 1.00 | 38.16 | 37.16 | 3.71 |
| 0.75% | 1.00 | 11.00 | 10.00 | 2.35 |
| 1.0% | 1.03 | 6.49 | 5.46 | 2.27 |
| 2.0% | 1.02 | 9.59 | 8.57 | 2.28 |
| 3.0% | 1.01 | 12.45 | 11.44 | 2.51 |

As noted by the aspect ratio measurements in Table 2, concentrations of polycarboxylate dendrimer which are effective for reducing the aspect ratio of urea crystals in a concentrated urea solution (i.e., a fertilizer composition) to a level which provides effective inhibition of caking in the urea solution have been found to be in a range of from about 0.75% to at least about 3.0% by weight of the total composition.

Accordingly, it has been found that employing amounts of polycarboxylate dendrimer in a range of from about 0.75% to at least about 3.0% by weight of the total composition, results in a reduction of the aspect ratio of the crystals in the fertilizer from a level of about 50 (in a control where the fertilizer sample comprises 100% urea) to a level of from about 5 to about 15 when the urea fertilizer sample is treated with polycarboxylate dendrimer compounds.

EXAMPLE 3

In this example, Aqueous Formulation C is a solution containing a polyol compound which is marketed under the trademark Hystar® 3375 by SPI Polyols, New Castle, Del., USA. Formulation C, containing 25% water 15% sorbitol and a minimum 20% maltitol, was added to the saturated urea 'stock' solution of Example 1 in the percentages noted in Table 3 employing the procedures set forth in Example 1. The crystal aspect ratios were measured as in Example 1, with the results shown in Table 3:

TABLE 3

Crystal Measurement Analysis for Aspect Ratio (Length to Width) in Aqueous Formulations Containing a Polyol

| Concentration of Polyol in Aqueous Formulation C | Minimum | Maximum | Range | Mean |
|---|---|---|---|---|
| 0% | 1.03 | 48.13 | 47.10 | 4.02 |
| 0.5% | 1.05 | 38.10 | 37.05 | 4.28 |
| 0.75% | 1.05 | 9.44 | 8.39 | 2.62 |
| 1.0% | 1.05 | 6.69 | 5.64 | 2.31 |
| 2.0% | 1.10 | 10.30 | 9.20 | 2.62 |
| 3.0% | 1.01 | 12.88 | 11.87 | 2.52 |

As noted by the aspect ratio measurements in Table 3, concentrations of polyol which are effective for reducing the aspect ratio of urea crystals in a concentrated urea solution (i.e., a fertilizer composition) to a level which provides effective inhibition of caking in the urea solution have been found to be in a range of from about 0.75% to at least about 3.0% by weight of the total composition. Employing such amounts of polyol, it has been found, that the aspect ratio of the crystals in the fertilizer are reduced from a level of about 50 (in a control where the fertilizer sample comprises 100% urea) to a level of from about 5 to about 15 when the urea fertilizer sample is treated with polyol compounds.

EXAMPLE 4

In this example, Aqueous Formulation D is a solution containing a polyol compound which is marketed under the trademark Malltisweet® 3145 by SPI Polyols, New Castle, Del., USA. Formulation D, containing approximately 25.0% water, approximately 5% sorbitol and approximately 65% maltitol, was added to a saturated urea 'stock' solution of Example 1 in the percentages noted in Table 4 employing the procedures set forth in Example 1. The crystal aspect ratios were measured as in Example 1, with the results shown in Table 4:

TABLE 4

Crystal Measurement Analysis for Aspect Ratio (Length to Width) in Aqueous Formulations Containing a Polyol

| Concentration of Polyol in Aqueous Formulation D | Minimum | Maximum | Range | Mean |
|---|---|---|---|---|
| 0% | 1.03 | 48.13 | 47.10 | 4.02 |
| 0.75% | 1.04 | 15.27 | 12.23 | 3.19 |
| 2.0% | 1.02 | 28.98 | 27.96 | 2.71 |
| 3.0% | 1.06 | 10.98 | 9.92 | 2.52 |

As noted by the aspect ratio measurements in Table 4, concentrations of polyol which are effective for reducing the aspect ratio of urea crystals in a concentrated urea solution (i.e., a fertilizer composition) to a level which provides effective inhibition of caking in the urea solution have been found to be in a range of from about 0.75% to at least about 3.0% by weight of the total composition. Employing such amounts of polyol, it has been found, that the aspect ratio of the crystals in the fertilizer are reduced from a level of about 50 (in a control where the fertilizer sample comprises 100% urea) to a level of from about 5 to about 15 when the MU fertilizer sample is treated with the polyol compounds.

EXAMPLE 5

In this example, Aqueous Formulation E is a solution containing a polyol compound which is marketed under the trademark SORBO® by SPI Polyols, New Castle, Del., USA. Formulation E containing 28.5-31.5% water and NLT 64% D-sorbitol, was added to a saturated urea 'stock' solution of Example 1 in the percentages noted in Table 5 employing the procedures set forth in Example 1. The crystal aspect ratio was measured as in Example 1, with the results shown in Table 5.

TABLE 5

Crystal Measurement Analysis for Aspect Ratio (Length to Width) in Aqueous Formulations Containing a Polyol

| Concentration of Polyol in Aqueous Formulation E | Minimum | Maximum | Range | Mean |
|---|---|---|---|---|
| 0% | 1.03 | 48.13 | 47.10 | 4.02 |
| 1.0% | 1.00 | 27.31 | 26.31 | 3.85 |
| 2.0% | 1.03 | 17.76 | 16.73 | 2.57 |
| 3.0% | 1.04 | 12.24 | 11.20 | 2.46 |

As noted by the aspect ratio measurements in Table 5, concentrations of polyol which are effective for reducing the aspect ratio of urea crystals in a concentrated urea solution. (i.e., a fertilizer composition) to a level which provides effective inhibition of caking in the urea solution have been found to be in a range of from about 1.0% to at least about 3.0% by weight of the total composition. Employing such amounts of polyol, it has been found, that the aspect ratio of the crystals in the fertilizer are reduced from a level of about 50 (in a control where the fertilizer sample comprises 100% urea) to a level of from about 5 to about 15 when the urea fertilizer sample is treated with the polyol compounds.

With regard to the following Examples 6-9 shown herein, the at least one CGM compound in each of the aqueous solutions tested to determine the level of urea crystal growth modification was heated to 170-180° F. to maintain consistently low viscosity (i.e., to ensure that the compounds were in the liquid state) and each was added to a molten methyleneurea resin, which in the molten state ranged in temperature from 265-285° F. Each mixture was agitated to achieve uniform distribution of the components and vented to remove excess water from the aqueous at least one CGM compound containing solution.

EXAMPLE 6

In this example, a reaction mixture comprising a urea-formaldehyde resin was prepared having a mole ratio of 4:1 which generated a resin with a final nitrogen distribution containing 55% unreacted urea, 30% methylene diurea (MDU) and dimethylene triurea (DMTU), 4% cold water insoluble nitrogen (CWIN), and 11% other water soluble methyleneurea (MU) fractions.

The reaction mixture was heated to a temperature of 250-275° F. until essentially all of the formaldehyde in the mixture was fully reacted and a molten or liquid urea-formaldehyde resin was formed. Then, solutions containing Hystar 3375, the polyol employed in Formulation C in Example 3 above, were added to the molten urea-formaldehyde MU resin reaction mixture in the percentages noted in Table 6 below in the temperature range of 160-170° F.

Then, the mixtures containing the noted concentrations of polyol (Hystar 3375) and urea-formaldehyde resin were sprayed on small finely divided solid raw material particles comprising ammonium sulfate, potassium sulfate and monoammonium phosphate and the urea-formaldehyde resin acted as a binder to agglomerate the solid particles within a matrix formed by the urea-formaldehyde resin producing a granular product with an average size of 1.4 mm in diameter.

The resulting products were allowed to cool to a temperature of about 85 F and to solidify into hard granular carrierless products which exhibited slow release nitrogen properties. In this Example 6, the final fertilizer NPK analysis was a 28-2-3, although it should be noted that other fertilizer nutrient analyses could be utilized, if desired.

Following the formation of the solidified carrierless products, an Active Ingredient (AI) solution containing 2,4-D and MCPP-p was coated on the surface of the fertilizer granules at a temperature ranging from 250-265° F., without the use of any additional solvent or carrier, to produce products having a concentration of 1.22% 2,4-D and 0.61% MCPP-p. The resulting complete combination products having the AI coating on the granules were then allowed to age in a warehouse at ambient temperatures for about 3 months and the crystal aspect ratios of the products were measured employing the same procedure as in Example 1, with the results shown in Table 6.

TABLE 6

Crystal Measurement Analysis for Aspect Ratio (Length to Width) in MU Fertilizers Containing a Polyol

| Concentration of Polyol in MU Fertilizer Products | Minimum | Maximum | Range | Mean |
|---|---|---|---|---|
| 0% | 1.07 | 33.47 | 32.40 | 2.78 |
| 2.0% | 1.02 | 15.25 | 14.23 | 2.32 |
| 2.5% | 1.01 | 8.98 | 7.97 | 2.42 |
| 3.0% | 1.03 | 8.22 | 7.19 | 2.42 |

As noted by the aspect ratio measurements in Table 6, concentrations of the polyol, Hystar 3375, which are effective for reducing the aspect ratio of urea crystals in a methyleneurea fertilizer to a level which provides effective inhibition of caking have been found to be in a range from about 2.0% to at least 3.0% by weight of the total composition. Employing such amounts of polyol, it has been found, that the aspect ratio of the crystals in the methyleneurea fertilizer are reduced from a level of about 30 when the fertilizer when the fertilizer is 100% methyleneurea resin (i.e., contains no polyol) as a control, to a level of from about 7 to about 15 when the fertilizer contains about 2.0 to about 3.0 wt. % polyol.

EXAMPLE 7

In this example, the reduction of caking in complete MU based fertilizer products was evaluated by preparing complete MU based combination fertilizer products employing the procedures described in Example 6. The complete combination fertilizer products contained a polyol, Hystar 3375, in the concentrations noted in Table 7 below and the AI solution coated on the surface of the fertilizer granules included 2,4-D and MCPP-p as described in Example 6. The resulting complete combination products, thus prepared, were placed in warehouse storage in plastic bags weighing about 15 Lbs. each.

The warehouse, located in Florida, was not temperature or humidity controlled and all materials were subjected to ambient conditions throughout the test period. The bags containing the complete combination fertilizer products were positioned on pallets and stacked under the weight of approximately 2400-3600 Lbs. for three months.

Following storage under these conditions, approximately forty bags of each concentration were evaluated and weight percentage of lumps was measured after dropping each bag one time to simulate a typical handling step. The results tabulated in Table 7 demonstrate the reduction in caking, as measured in terms of wt. % lumps, as the concentration of polyol in the products is increased to 3 wt. %.

TABLE 7

Caking Inhibition Evaluation in MU Fertilizers Containing a Polyol

| Concentration of Polyol in MU Fertilizer Products | Wt. % Lumps after 3-months |
|---|---|
| 0% | 20a |
| 2.0% | 9b |
| 2.5% | 6c |
| 3.0% | 3d |

Furthermore, the statistical significance of each data point mean in Table 7, was determined by considering the forty bags containing each concentration of polyol as one data population and the mean of each population is shown in Table 7 for each such concentration.

A 95% confidence interval (CI) was then calculated for the mean of each population. The total range of the 95% CI was then assigned a letter designation (e.g., the 0% concentration, of polyol was assigned letter 'a') which follows the numerical mean value in the results tabulated in Table 7. The total range of each sample mean's 95% CI was compared to each other population and if the CI's did not overlap, the mean values and each population were considered statistically different and were assigned unique letter designations b, c, d as shown in Table 7. The results of this statistical analysis indicated that the caking reduction noted by each increasing percentage of polyol concentration was significant.

EXAMPLE 8

In this example, a solution containing a quaternary ammonium chloride compound was added to a molten urea-formaldehyde MU resin reaction mixture in the percentages noted in Table 8 below in the temperature range of 160-170F in accordance with the procedures in Example 6. Specifically, the quaternary ammonium chloride compound was the tallowalkyltrimethyl ammonium chloride marketed under the Arquad T-27W trademark as described hereinabove. The urea to formaldehyde mole ratio of the resin was 4:1 which generated a resin with a final nitrogen distribution containing 55% unreacted urea, 30% methylene diurea (MDU) and dimethylene triurea (DMTU), 4% cold water insoluble nitrogen (CWIN), and 11% other water soluble methyleneurea (MU) fractions. This resin was then utilized to granulate and prepare complete fertilizers of the type described in U.S. Pat. No. 6,039,781.

An AI, such as a herbicide solution containing 2,4-D and MCPP-p was then coated on the surface of the complete fertilizers to form complete combination products. These products were allowed to age for a period of about 3 months and the crystal aspect ratios were measured employing the same procedure as in Example 1, with the results shown in Table 8.

TABLE 8

Crystal Measurement Analysis for Aspect Ratio (Length to Width) in MU Fertilizers Containing a Quaternary Ammonium Chloride

| Concentration of Quaternary Ammonium Salt in MU Fertilizer Products | Minimum | Maximum | Range | Mean |
|---|---|---|---|---|
| 0% | 1.07 | 33.47 | 32.40 | 2.78 |
| 3.0% | 1.03 | 7.71 | 6.68 | 2.40 |

As noted by the aspect ratio measurements in Table 8, a concentration of quaternary ammonium chloride (Arquad T-27W) which is effective for reducing the aspect ratio of urea crystals in a methyleneurea fertilizer to a level which provides effective inhibition of caking has been found to be about 3.0% by weight of the total composition. Employing such amount of quaternary ammonium chloride, it has been found, that the aspect ratio of the crystals in the methyleneurea fertilizer was reduced from a level of about 30 when the fertilizer is 100% methyleneurea resin (i.e., contains no quaternary ammonium chloride) as a control, to a level of about 7 when the fertilizer contains about 3.0 wt. % quaternary ammonium chloride.

EXAMPLE 9

In this example, the reduction of caking in complete MU based fertilizer products was evaluated by preparing complete MU based combination fertilizer products employing the procedures described in Example 6. The complete combination products contained a quaternary ammonium chloride, Arquad T-27W, in the concentrations noted in Table 9 below and the AI herbicide solution coated on the surface of the fertilizer granules included 2,4-D and MCPP-p as described in Example 8. The resulting complete combination products thus prepared were placed in warehouse storage in plastic bags weighing about 15 Lbs. each.

The warehouse, located in Florida, was not temperature or humidity controlled and all materials were subjected to ambient conditions throughout the test period. The bags containing the complete combination fertilizer products were positioned on pallets and stacked under the weight of approximately 2400-3600 Lbs. for three months.

Following storage under these conditions, approximately forty bags of each concentration were evaluated and weight percentage of lumps was measured after dropping each bag one time to simulate a typical handling step. The results tabulated in Table 9 demonstrate the reduction in caking, as measured in terms of wt. % lumps, as the concentration of quaternary ammonium chloride in the products is increased to 3 wt. %.

TABLE 9

Caking Inhibition Evaluation in MU Fertilizers Containing a Quaternary Ammonium Salt

| Concentration of Quaternary after Ammonium Salt in MU Fertilizer Products | Weight % Lumps 3-months |
|---|---|
| 0% | 20a |
| 3.0% | 9b |

Furthermore, the statistical significance of each data point mean in Table 9, was determined by considering the forty bags containing each concentration of quaternary ammonium salt as one data population and the mean of each population is shown in Table 9 for each such concentration. A 95% confidence interval (CI) was then calculated for the mean of each population. The total range of the 95% CI was then assigned a letter designation (e.g., the 0% concentration of quaternary ammonium salt was assigned letter 'a') which follows the numerical mean value in the results tabulated in Table 9. The total range of each sample mean's 95% CI was compared to each other population and if the CI's did not overlap, the mean values and each population were considered statistically different and were assigned a unique letter designation b as shown in Table 9. The results of this statistical analysis indicated that the caking reduction noted by the increased percentage of quaternary ammonium salt concentration was significant.

From the results tabulated hereinabove, it should be clear that concentrations of at least one compound selected from the group consisting of quaternary ammonium compounds, salts of quaternary ammonium compounds, carboxylate based dendrimers, polyols and mixtures thereof, are readily ascertainable which are sufficient to reduce the crystal aspect ratio of urea crystals in a urea containing fertilizer from a range of almost 50 or more to a level which provides effective inhibition of caking in a urea solution and/or a urea based fertilizer product (e.g., in a range of from about 5:1 to about 15:1), such that caking of the fertilizers due to urea crystal growth is effectively eliminated.

Although the invention has been described in its preferred forms with a certain degree of particularity, it is to be understood that the present disclosure has been made by way of example only. Numerous changes in the details of the compositions and ingredients therein as well as the methods of preparation and use will be apparent without departing from the spirit and scope of the invention, as defined in the appended claims.

What is claimed is:

1. A urea containing fertilizer product comprising:
a urea containing fertilizer that is treated with an aqueous formulation containing at least one compound selected from quaternary ammonium compounds, salts of quaternary ammonium compounds, carboxylate based dendrimers, polyols or mixtures thereof, the at least one compound being present in the aqueous formulation in an amount sufficient to modify formation of crystals in the urea containing fertilizer to a level such that the crystal aspect ratios of the crystals formed in the fertilizer are reduced sufficiently to effectively eliminate caking in the treated fertilizer, wherein the crystal aspect ratios of the crystals formed in the urea containing fertilizer treated with the composition are reduced to a level in a range from about 5 to about 15.

2. The product of claim 1 wherein the at least one compound is present in the composition in an amount of about 0.5% to about 3.0% by weight of the composition.

3. The product of claim 1, wherein the said at least one compound is a tallowalkyltrimethyl ammonium salt.

4. The product of claim 1, wherein the said at least one compound is tallowalkyltrimethyl ammonium chloride.

5. The product of claim 1, wherein the said at least one compound is di(hydrogenated tallowalkyl) dimethyl ammonium chloride.

6. The product of claim 1, wherein the said at least one compound is a polycarboxylate dendrimer.

7. The product of claim 1, wherein the said at least one compound is included as a polyol formulation containing maltitol.

8. The product of claim 1, wherein the said at least one compound is D-sorbitol.

9. The product of claim 1, wherein the said urea containing fertilizer is a urea-formaldehyde fertilizer.

* * * * *